United States Patent [19]

Mikuniya et al.

[11] Patent Number: 4,691,963
[45] Date of Patent: Sep. 8, 1987

[54] TANDEM SEAT FOR A TWO-WHEELED VEHICLE

[75] Inventors: Kunio Mikuniya; Akira Kojima, both of Akishima, Japan

[73] Assignee: Tachikawa Spring Co. Ltd., Tokyo, Japan

[21] Appl. No.: 768,448

[22] Filed: Aug. 22, 1985

[30] Foreign Application Priority Data

Aug. 30, 1984 [JP] Japan .................... 59-132555[U]
Aug. 31, 1984 [JP] Japan .................... 59-133281[U]

[51] Int. Cl.$^4$ .............................................. B62J 1/00
[52] U.S. Cl. .................... 297/195; 297/243; 297/455
[58] Field of Search .............. 297/195, 243, DIG. 9, 297/233, 455, 456, DIG. 1, 452; 5/472

[56] References Cited

U.S. PATENT DOCUMENTS

| | | | |
|---|---|---|---|
| 3,988,034 | 10/1976 | Fister, Jr. ........................ | 297/455 |
| 4,123,825 | 11/1978 | Messler et al. ................... | 5/472 |
| 4,225,183 | 9/1980 | Hanagan et al. .................. | 297/243 X |
| 4,317,591 | 3/1982 | Ramsey ............................. | 297/455 |
| 4,462,634 | 7/1984 | Hanagan ........................... | 297/243 X |
| 4,527,831 | 7/1985 | Katsuoka ........................... | 297/243 |
| 4,563,038 | 1/1986 | Hirose ............................... | 297/243 |

FOREIGN PATENT DOCUMENTS

| | | | |
|---|---|---|---|
| 112684 | 11/1928 | Austria .............................. | 297/243 |
| 177076 | 5/1953 | Austria .............................. | 297/243 |
| 937145 | 12/1955 | Fed. Rep. of Germany ...... | 297/243 |
| 702574 | 1/1931 | France ............................... | 297/243 |

*Primary Examiner*—Peter A. Aschenbrenner
*Attorney, Agent, or Firm*—Cushman, Darby & Cushman

[57] ABSTRACT

A tandem seat for a two-wheeled vehicle comprises a bottom of hard synthetic resin to be fixed to a vehicle body, a pad of foam material to be placed onto the bottom and a trim cover assembly for covering the pad. In this tandem seat, recessed grooves are formed in the respective sides of the above-mentioned bottom and pad. These recessed grooves extend along the interfaces between the front and rear seat sections of the tandem seat. The trim cover assembly is thrust into the recessed grooves to separate the front and rear seat sections from each other, so that such an appearance like a split seat is obtained.

2 Claims, 16 Drawing Figures

TANDEM SEAT FOR A TWO-WHEELED VEHICLE

BACKGROUND OF THE INVENTION

1. Field of the Invention

The present invention relates to a tandem seat for a two-wheeled vehicle and, more particularly, to such tandem seat which comprises a bottom of a hard material to be fixed to a vehicle floor, a pad of a foam material placed onto the bottom, and a trim cover assembly for covering the pad.

2. Description of the Prior Art

A tandem seat for a two-wheeled vehicle is classified into a split seat and an integral seat.

The split seat includes a front seat and a rear seat which are produced separately from each other and arranged one behind another serially. This seat is pleasing in appearance but, it is disadvantageous in that its productivity is poor because the respective component members of the front and rear seats, that is, the bottom, pad and trim cover assembly are manufactured separately from one another.

On the other hand, the integral seat includes a front seat and a rear seat integrally formed with integralness each other, which eliminates the need to manufacture its bottom, pad, and trim cover assembly as in the above-mentioned split seat and thus reduces the number of man-hours, so that the finished seat is very economical. However, since its front and rear seats are integrally arranged with each other to leave no separation therebetween, the integral seat is not as pleasing in appearance as the split seat and lacks a gorgeous appearance.

In order to avoid the above-mentioned drawbacks of the prior art, as shown in FIG. 16, there has been proposed another integral seat which looks as if it were a split seat. In this seat, however, since its right and left side portions (C') located in the interfaces between its front seat section (A') and is rear seat section (B') are flat and are not fastened at all, split trimming can not be done well, so that the drawbacks found in the above-mentioned integral seat cannot be eliminated completely.

SUMMARY OF THE INVENTION

The present invention aims at eliminating the drawbacks found in the above-mentioned integral seats.

Accordingly, it is an object of the invention to provide an improved integral tandem seat which looks like a split seat so as to be pleasing in appearance, as well as to be economical to produce.

In accomplishing this object, according to one aspect of the present invention, in the respective sides of a bottom and a pad, there are formed recessed grooves extending along the boundary portion or interface between a front seat section and a rear seat section, and a trim cover assembly is thrust into such recessed grooves to separate the front seat section from the rear seat section so as to provide an appearance as if the present inventive seat were a split seat.

It is another object of the invention to provide an integral tandem seat which looks like a split seat so as to be pleasing in appearance, provides a comfortable sitting feeling, and prevents water from staying between the front and rear seat sections thereof.

In order to achieve this object, according to another aspect of the invention, a bottom comprises a front bottom section and a rear bottom section which are integrally formed with each other, a pad comprises a front pad section and a rear pad section which are formed separately from each other, and a trim cover assembly comprises a front trim cover assembly section and a rear trim cover assembly section which are arranged one behind another and formed integrally with each other by means of an angle welding portion.

Accordingly, since the front and rear seat sections of the present integral seat are apparently separated from each other, the present integral seat is pleasing in appearance like a split seat. Also, due to the separation of the trim cover assembly by the welding portion, when occupants are respectively seated on the front and rear seat sections of the present seat, the trim cover assembly will not be stretched so as to provide a comfortable sitting feeling.

Other objects and aspects of the invention will become apparent from the following description of embodiments with reference to the accompanying drawings.

DETAILED DESCRIPTION OF PREFERRED EMBODIMENTS OF THE INVENTION

With reference to FIGS. 1–7, a first embodiment of the invention will now be discussed.

Figure 1:
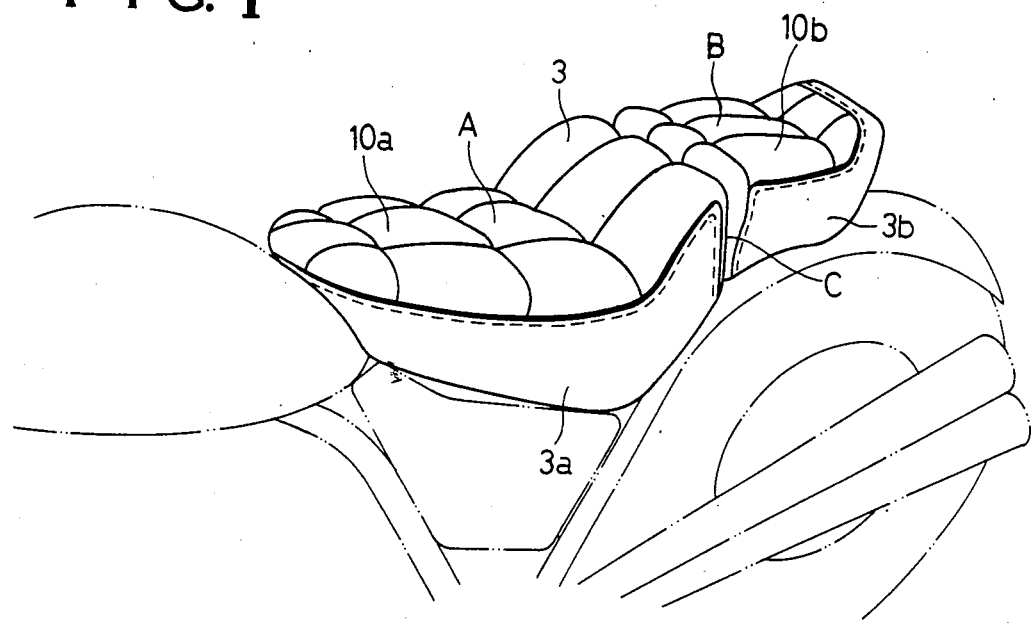
FIG. 1 is a perspective view of a first embodiment of a tandem seat for a two-wheeled vehicle according to the invention.

FIG. 1 illustrates a state in which a tandem seat of the invention is being used in a two-wheeled vehicle. In FIG. 1 there is a front seat section (A) of the above seat, a rear seat section (B) thereof, and an interface (C) between the front and rear seat sections (A) and (B), which will be described in detail with reference to FIG. 2.

Figure 4:
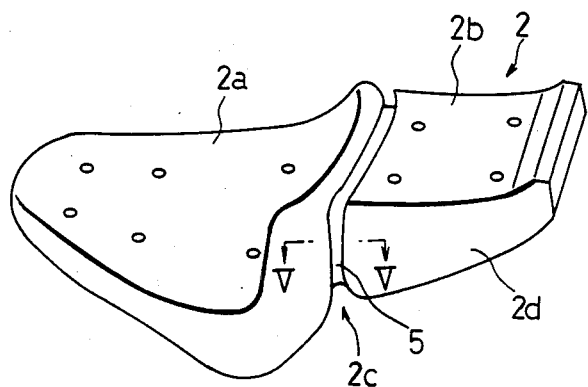
FIG. 4 is a perspective view of a seat pad employed in the above first embodiment.
Figure 6:
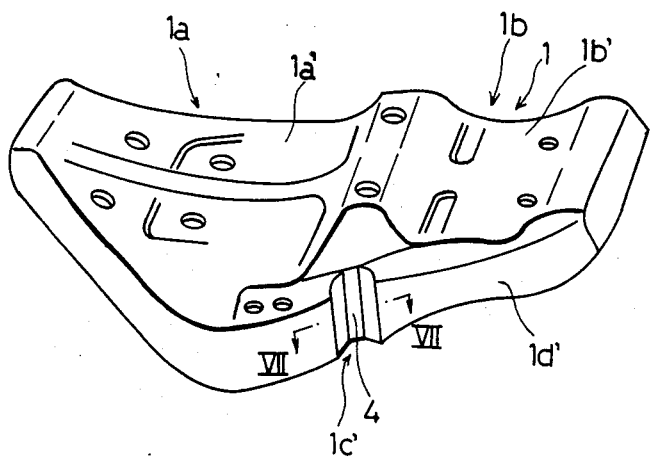
FIG. 6 is a perspective view of a seat bottom employed in the above first embodiment.

The front and rear seat sections (A) and (B) are formed in such a manner that a single bottom (1) of hard synthetic resin material shown in FIG. 6 is prepared, a single pad (2) of foam material shown in FIG. 4 is superposed on the bottom (1), and the bottom (1) and pad (2) are then covered by a trim cover assembly (3).

Figure 7:
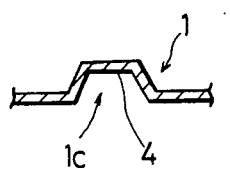
FIG. 7 is an enlarged sectional view taken along line VII—VII in FIG. 6.

The bottom (1), as shown in FIG. 6, includes a front bottom section (1a) and a rear bottom section (1b) which are formed integrally with each other, while the top surface of the front bottom section (1a) forms a front sitting surface (1a') and the top surface of the rear bottom section (1b) forms a rear sitting surface (1b'). The bottom (1) is also provided in the right and left sides of the two bottom sections (1a) (1b) thereof with side surfaces (1d') which are substantially vertical walls, respectively. Each of the side surfaces (1d') is formed with a recessed groove (4) as shown in FIG. 7 extending along the interface (1c') of the front sitting surface (1a') and the rear sitting surface (1b').

Figure 5:
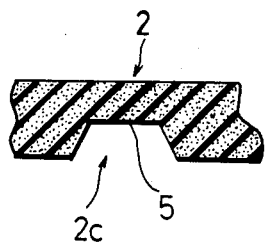
FIG. 5 is an enlarged sectional view taken along line V—V in FIG. 4.

Also, the pad (2), as shown in FIG. 4, comprises a front pad section (2a) and a rear pad section (2b) which are molded of urethane foam integrally with each other. The pad (2) is also formed in the right and left sides (2d) with recessed grooves (5) as shown in FIG. 5 extending along the interface (2c) between the front pad section (2a) and the rear pad section (2b).

Figure 2:
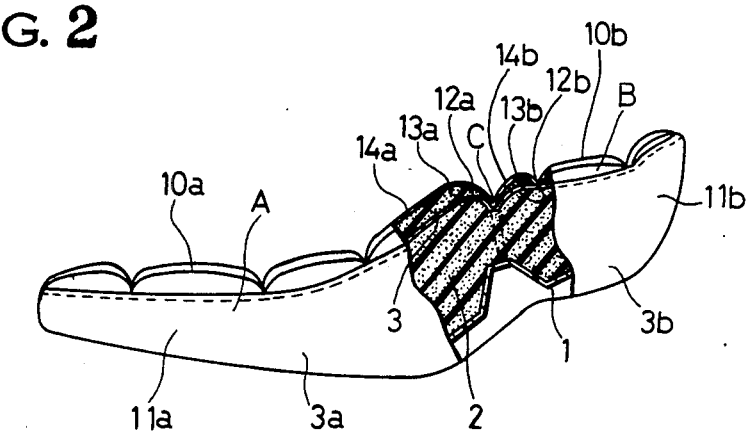
FIG. 2 is a partially cutaway front view of the seat in FIG. 1.
Figure 3:
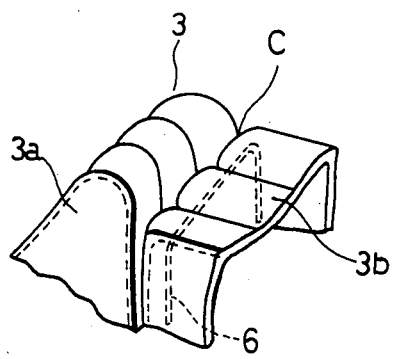
FIG. 3 is an enlarged partial view of the main portions of a trim cover assembly employed in the above first embodiment.

The trim cover assembly (3), as shown in FIGS. 2 and 3, comprises a front trim cover assembly (3a) and a rear trim cover assembly (3b) which are formed integrally with each other. The front trim cover assembly (3a) is composed of a body (10a) and a side portion (11a) of a single covering material, while the rear trim cover assembly (3b) is composed of a body (10b) and a side portion (11b). The front body (10a) is a lamination of a wadding cover of nonwoven fabric or the like, a wadding of foam material (slab material) (13a) and a covering material (14a), while the rear body (10b) is a lamination of a wadding cover of nonwoven fabric, a wadding (13b) of foam (slab) material and a covering material (14b). The wadding covers (10a) (10b) are in part integrally welded to the covering materials (14a) (14b) by a welder, respectively.

Connecting portions between the front and rear trim cover assemblies (3a) and (3b), as shown in FIG. 3, are formed integrally by means of high-frequency welding, and the connecting portions (6) are thrust into the respective grooves (4) and (5) formed in the bottom (1) and pad (2), so that the connecting portions (6) are provided in a tensioned manner.

The terminals of the trim cover assembly (3) are secured to the bottom (1) by securing means such as a hog ring.

According to the invention, the pad and bottom are formed with the recessed grooves, respectively, and the trim cover assembly is extended in tension due to its thrust into these recessed grooves, so that the lateral portions in the respective sides of the trim cover assembly can be perfectly treated in their split trimming. Since the sides of the invention are fastened or tied up, the invention provides such an external view as a split seat, enhancing its commercial value. Also, as there is no need to form the front and rear sections of the respective bottoms, pads and trim cover assemblies separately from each other, the productivity of the invention is greatly increased when compared with the above-described conventional split seat.

Referring now to FIGS. 8-14, there is illustrated a second embodiment of the invention.

Figure 8:
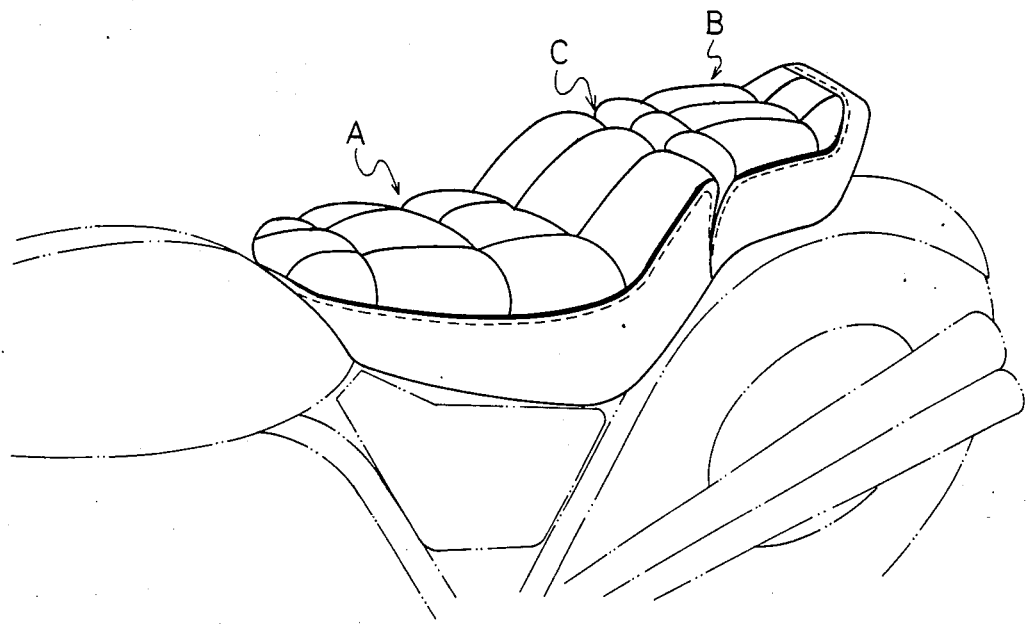
FIG. 8 is a perspective view of a second embodiment according to the invention.
Figure 9:
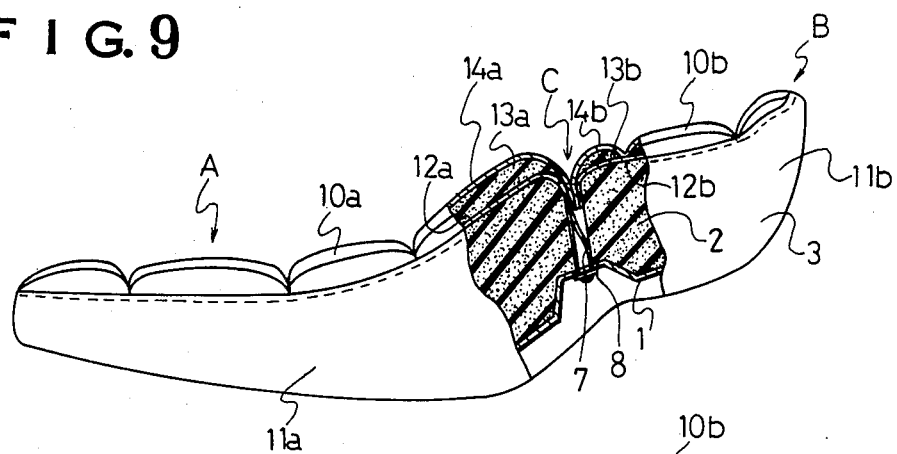
FIG. 9 is a partially cutaway front view of the second embodiment of FIG. 8.

Specifically, FIG. 8 illustrates a state in which the second embodiment of the invention is being used. In the FIGS. 8-14 there is a front seat section (A) of the present tandem seat, a rear seat section (B) thereof, and a boundary portion or an interface (C) between the front and rear seat sections (A) and (B). These sections (A), (B) and (C) will be now discussed by way of FIGS. 8-14.

Figure 13:
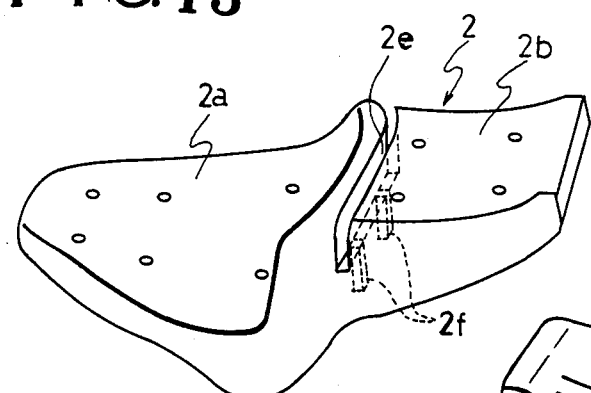
FIG. 13 is a perspective view of a pad employed in the second embodiment of the invention.
Figure 14:
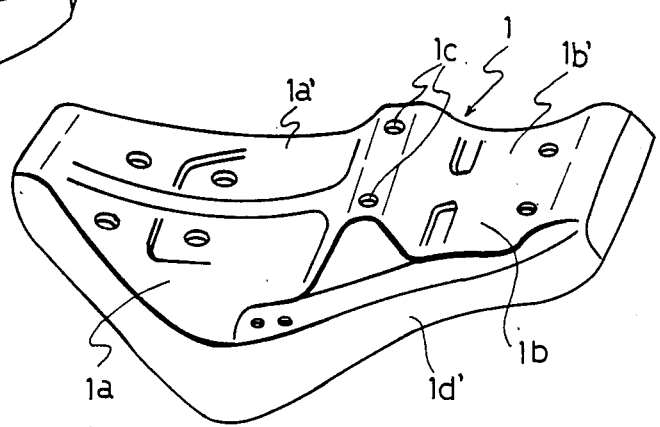
FIG. 14 is a perspective view of a bottom employed in the above second embodiment.

The front and rear seat sections (A) and (B) are composed of a single bottom (1) shown in FIG. 14, a single pad (2) shown in FIG. 13 is superposed on the bottom (1), and a trim cover assembly (3) is so provided as to cover the bottom (1) and pad (2).

The bottom (1), as shown in FIG. 14, comprises a front bottom section (1a) and a rear bottom section (1b) formed of hard synthetic resin integrally with each other, and also includes a front sitting surface (1a'), a rear sitting surface (1b'), and two side surfaces (1d') in the peripheries of the front and rear sitting surfaces. Also, there are formed mount holes (1c) (1c) between the front and rear bottom sections (1a) and (1b).

The pad (2) is formed of foam material and, as shown in FIG. 13, includes a front pad section (2a) and a rear pad section (2b) integrally formed with each other. It is formed with a slit groove (2e) in the interface between the front and rear pad sections (2a) and (2b) as well as mount holes (2f) (2f) extending from the slit groove (2e) through the bottom surface thereof.

Figure 10:
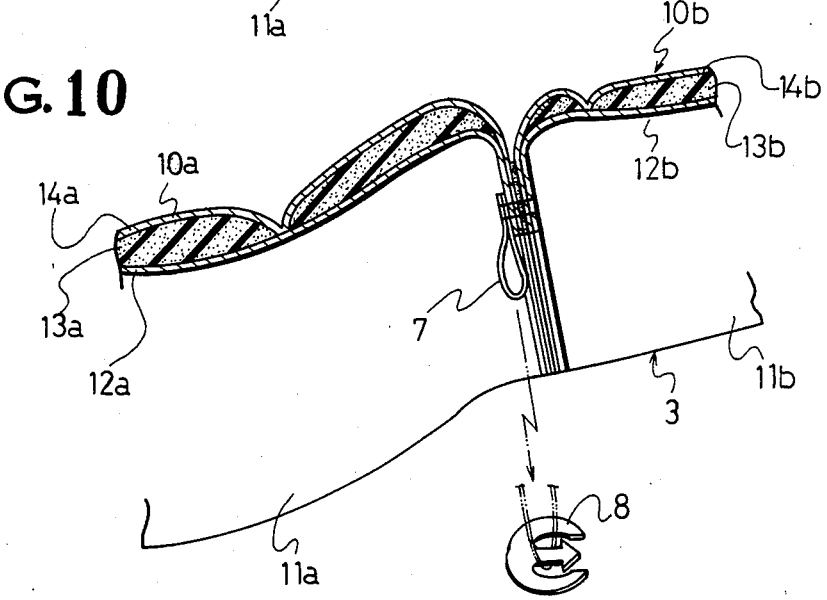
FIG. 10 is an enlarged, exploded view of the main portions of FIG. 9.
Figure 11:
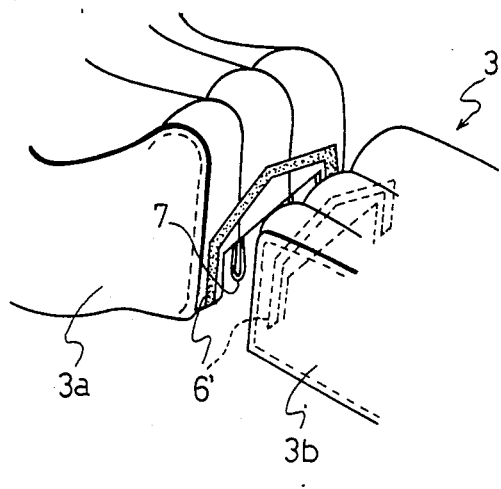
FIG. 11 is an exploded perspective view of a welding portion.
Figure 12:
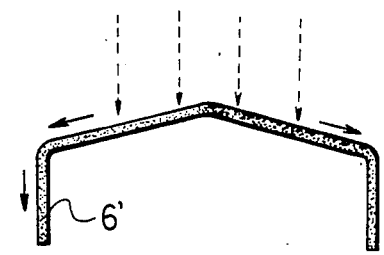
FIG. 12 is a side view to illustrate the shape of the above-mentioned welding portion.

The trim cover assembly (3), as shown in FIGS. 10-12, comprises a front trim cover assembly section (3a) forming the front seat section (A) and a rear trim cover assembly section (3b) forming the rear seat section (B) which are connected with each other by a welding portion (6').

As shown in FIG. 10, the front trim cover section (3a) comprises a body (10a) and a side portion (11a) formed of a single covering material while the rear trim cover section (3b) comprises a body (10b) and a side portion (11b) of a single covering material. The body (10a) is a lamination of a wadding cover (12a) of nonwoven fabric or the like, a wadding (13a) of foam material (slab material), and a covering material (14a), while the body (10b) is a lamination of a wadding cover (12b) of nonwoven fabric or the like, a foam (slab material) wadding (13b) and a covering material (14b). These laminations are in part welded to each other by a welder so as to be integral with each other.

The welding portion (6'), as shown in FIGS. 11 and 12, is formed in a substantially inverted V-shaped configuration and is welded by means or high frequency. Therefore, even if rain or the like may penetrate into the interface between the front seat section (A) and the rear seat section (B), as shown by arrows in FIG. 12, the rain is forced to flow along the angled weld portion (6') and will not stay in the interface portion.

The above-mentioned weld portion (6') is provided with hanging strings (7) sew thereto, so that, when the trim cover assembly (3), pad (2) and bottom (1) are superposed on one another, the strings (7) can be inserted through the mount holes (1c) and (2f) respectively formed in the pad (2) and bottom (1) and be engaged with a substantially E-shaped engagement button (8) as shown in FIG. 10.

Figure 15:
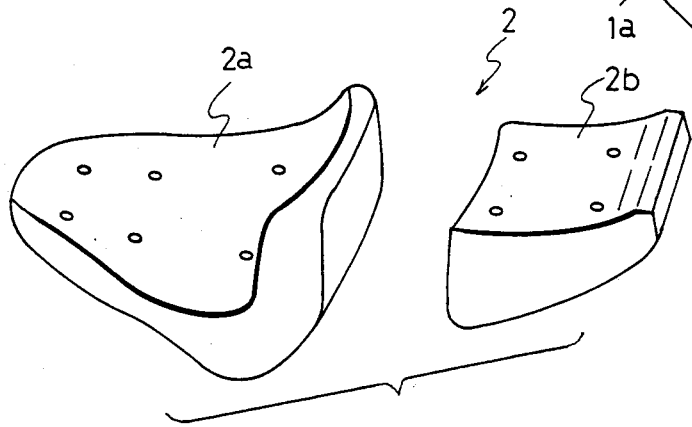
FIG. 15 is a perspective view of a pad employed in a third embodiment of the invention; and, FIG. 16 is a perspective view of a conventional tandem seat.
Figure 16:
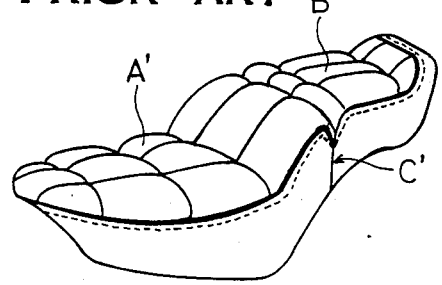

Referring now to FIG. 15, there is illustrated a third embodiment of the invention in which a pad (2) is divided into a front pad section (2a) and a rear pad section (2b), while other components of this third embodiment are the same as in the above-mentioned second embodiment and thus the discussion on these components will be omitted here.

Due to the construction as mentioned above, the invention has such effects as follows:

Since the pad and trim cover assembly are respectively formed in a substantially split manner, even when the occupant is seated on the present inventive seat, the trim cover assembly will not be stretched in tension so that a comfortable sitting feeling is obtained and also the shape of the trim cover assembly is hard to collapse.

As there is no need to manufacture the front and rear sections of the seat separately as in a split seat, the invention requires a smaller number of man-hours and can be produced quite economically.

Because the weld portion is formed in an angle configuration, even in case of rain, the rain is easy to flow away and will not stay there to prevent the occupant's clothing from being stained.

Due to its appearance like a split seat, the invention is more pleasing in appearance than the conventional integral seats.

What is claimed is:

1. In a tandem seat for a two-wheeled vehicle having a bottom with lateral side portions, a pad placed onto said bottom, and a trim cover assembly for covering said pad, said trim cover assembly including a front seat section, a rear seat section integrally formed with said front seat section, and an interface portion formed between said front and rear seat sections, the improvement comprising:

a front pad portion formed in said pad in such dimensions as to correspond to dimensions of said front seat section;

a rear pad portion formed in said pad in such dimensions as to correspond to dimensions of said rear seat section;

an interface portion defined between said front and rear pad portions and having a first recessed groove formed thereat so as to extend along a transverse direction of said front and rear pad portions;

said lateral side portions of said bottom having second recessed grooves extending in a direction perpendicular to said transverse direction of said first recessed groove;

said front and rear seat sections of said trim cover assembly, having formed therebetween an inverted U-shaped connecting portion extending along said interface portion of said trim cover assembly, whereby said connecting portion of said trim cover assembly is thrust into and engaged with both said first and second recessed grooves.

2. In a tandem seat for a two-wheeled vehicle having a bottom formed with a recessed bottom wall portion, a pad placed onto said bottom, and a rain impermeable trim cover assembly for covering said pad, said trim cover assembly including a front seat section, a rear seat section integrally formed with said front seat section, and an interface portion formed between said front and rear seat sections, the improvement comprising:

a front pad portion formed in said pad in such dimensions as to correspond to dimensions of said front seat section;

a rear pad portion formed in said pad in such dimensions as to correspond to dimensions of said rear seat section;

an interface portion defined between said front and rear pad portions and having a slit groove formed in said pad so as to extend thereacross;

said pad being perforated with at least one hole that extends from said slit groove through said pad;

a substantially inverted V-shaped connecting portion formed as a seal against rain between said front and rear seat sections of said trim cover assembly, so as to extend along said interface portion of said trim cover assembly:

at least one hanging string being concealed within said trim cover and having an upper end and a lower end, said hanging string being fixed at the upper end to said connecting portion and being inserted through said hole; and means, adapted to be connected with the lower end of said hanging string, for engaging said hanging string at the recessed bottom wall portion of said bottom, wherein said trim cover assembly is pulled downwardly over the pad at the interface portion thereof.

* * * * *